US012577506B2

(12) United States Patent
Pembery et al.

(10) Patent No.: US 12,577,506 B2
(45) Date of Patent: Mar. 17, 2026

(54) USE OF ENCAPSULATED NATURAL COLORS

(71) Applicant: Sensient Colors UK Ltd, King's Lynn (GB)

(72) Inventors: Michael John Pembery, King's Lynn (GB); Alejandro Burgos Cara, Granada (ES)

(73) Assignee: Sensient Colors UK Ltd, King's Lynn (GB)

( * ) Notice: Subject to any disclaimer, the term of this patent is extended or adjusted under 35 U.S.C. 154(b) by 859 days.

(21) Appl. No.: 17/637,307

(22) PCT Filed: Aug. 21, 2020

(86) PCT No.: PCT/GB2020/052023
§ 371 (c)(1),
(2) Date: Feb. 22, 2022

(87) PCT Pub. No.: WO2021/038209
PCT Pub. Date: Mar. 4, 2021

(65) Prior Publication Data
US 2022/0282190 A1     Sep. 8, 2022

(30) Foreign Application Priority Data

Aug. 23, 2019     (GB) ...................................... 1912151

(51) Int. Cl.
*C09B 61/00*          (2006.01)
*B01J 13/04*          (2006.01)
(Continued)

(52) U.S. Cl.
CPC .............. *C11D 3/40* (2013.01); *B01J 13/043* (2013.01); *B01J 13/08* (2013.01); *C09B 7/00* (2013.01);
(Continued)

(58) Field of Classification Search
CPC ....... C11D 3/40; C11D 3/001; C11D 2111/12; C11D 2111/14; B01J 13/043; B01J 13/08;
(Continued)

(56) References Cited

U.S. PATENT DOCUMENTS 5,976,575 A     11/1999 Gellenbeck
2008/0160084 A1*  7/2008 Huynh ................... C09B 63/00
                                                       106/125.1

FOREIGN PATENT DOCUMENTS

CN          1826094 A  *  8/2006  .............. A61K 8/11
KR      20180053048          5/2018
(Continued)

OTHER PUBLICATIONS

International Search Report & Written Opinion, for International Application No. PCT/GB2020/052023, dated Dec. 16, 2020, (20 pages).
(Continued)

*Primary Examiner* — Eisa B Elhilo
(74) *Attorney, Agent, or Firm* — GTC Law Group PC & Affiliates

(57)          ABSTRACT

Use of an encapsulated natural color for coloring a household, industrial or institutional (HI&I) product wherein the encapsulated natural color is stable in water to simulated solar irradiation at 765 Watt in accordance with International Commission on Illumination 85 (1989, Table 4, 3 mm window glass) reference sun for a period of between 8 hours and 16 hours.

17 Claims, 5 Drawing Sheets

10

FAB - CuOEMD control

FC - CuOEMDUV17

11

Figure 1A:

(51) Int. Cl.

| | |
|---|---|
| *B01J 13/08* | (2006.01) |
| *C09B 7/00* | (2006.01) |
| *C09B 47/00* | (2006.01) |
| *C09B 67/02* | (2006.01) |
| *C11D 3/00* | (2006.01) |
| *C11D 3/40* | (2006.01) |

(52) U.S. Cl.
CPC .............. *C09B 47/00* (2013.01); *C09B 61/00* (2013.01); *C09B 67/0097* (2013.01); *C11D 3/001* (2013.01); *C11D 2111/12* (2024.01); *C11D 2111/14* (2024.01)

(58) Field of Classification Search
CPC . B01J 13/22; C09B 7/00; C09B 47/00; C09B 61/00; C09B 67/0097; C09B 67/009; C09B 67/0013; C09B 7/02
USPC ........................................................... 8/647
See application file for complete search history.

(56) References Cited

FOREIGN PATENT DOCUMENTS

| TW | 201114372 A | 5/2011 | |
|---|---|---|---|
| WO | 2006066389 | 6/2006 | |
| WO | WO 2006066389 A1 * | 6/2006 | ............. C09B 61/00 |

OTHER PUBLICATIONS

Combined Search and Examination Report Under Sections 17 and 18(3), for Foreign Application No. GB1912151.6, dated Feb. 13, 2020, (7 pages).

Examination Report Under Section 18(3) for Foreign Application No. GB1912151.6, dated Jun. 26, 2020, (3 pages).

de Boer, F.Y. et al., "Encapsulaton of Colorants by Natural Polymers for Food Applications," Coloration Technology, published by John Wiley & Sons Ltd on behalf of Society of Dyers and Colourists, Colora, T echnol., 135 (2019), pp. 183-194.

dos Santos, C. et al., "Color and Fastness of Natural Dyes Encapsulated by a Sol-Gel Process for Dyeing Natural and Synthetic Fibers," Journal of Sol-Gel Science and Technology (2018) pp. 351-364.

Kurniasih, R.A. et al., "Effect of Different Coating Materials on The Characteristics of Chlorophyll Microcapsules from Caulerpa Racemosa," IOP Conference Series: Earth and Environmental Science 116 (2018) pp. 1-10.

Kang, Y.R. et al., "Characterization and Storage Stability of Chlorophylls Microencapsulated in Different Combination of Gum Arabic and Maltodextrin," Food Chemistry 272 (2019) pp. 337-346.

Belscak-Cvitanovic, et al., "Efficiency Assessment of Natural Biopolymers as Encapsulants of Green Tea (*Camellia sinensis* L.) Bioactive Compounds by Spray Drying," Food Bioprocess Technol (2015) pp. 2444-2460.

Ozkan, G. et al., "Microencapsulation of Natural Food Colourants," International Journal of Nutrition and Food Sciences (2014) pp. 145-156.

Cano-Higuita, D.M. et al., "Stability of Curcumin Microencapsulated by Spray and Freeze Drying in Binary and Ternary Matrices of Maltodextrin, Gum Arabic and Modified Starch", Journal of Food Processing and Preservation, (39), (2015), pp. 2049-2060.

Przybysz, M.A. et al., "The Stability of Spray-Dried Microencapsulated β-Carotene In the Mixture of Gum Arabic, OSA-Type Modified Starch and Maltodextrin", Ital. J. Food Sci., vol. 28, (2016)—Paper, 17 pages.

Examination Report for International Application No. 20764740.5, dated Aug. 20, 2024, 13 pages.

* cited by examiner

Encapsulated natural indigo - spray dried

Without exposure

After exposure

Encapsulated natural indigo - emulsion

Without exposure

After exposure

USE OF ENCAPSULATED NATURAL COLORS

CROSS REFERENCE TO RELATED APPLICATIONS

This application claims the benefit of PCT/GB2020/052023 filed Aug. 21, 2020, having a priority claim to British Patent Application No. GB1912151.6 filed Aug. 23, 2019. The contents of these prior patent documents are incorporated herein by reference.

The present invention is concerned with the use of an encapsulated natural color for coloring a household, industrial or institution (HI&I) composition or product. The present invention is also concerned with HI&I compositions or products comprising an encapsulated natural color and with methods for manufacture and coloring of a HI&I composition or product.

HI&I products are products which are intended for routine use in the home or in offices, institutions, warehouses, industrial facilities and the like. The market for HI&I products, especially HI&I cleaning products, has recently enjoyed a sustained growth on the back of increasing safety and environmental regulations and growing public awareness of health and hygiene.

Consumers of HI&I cleaning compositions include not only the ordinary householder but also for example, food and/or beverage manufacturers, the automotive and transportation industry, commercial cleaning services, building service contractors, retailers such as supermarkets, restaurants, hotels, hospitals, nursing homes, local authorities and the like.

There is an increasing demand amongst these consumers for environmentally sustainable HI&I cleaning products which are effective and are easy to use. This demand (evidenced by organic certification bodies such as Eco-Cert®) extends not only to the active cleaning ingredients but also to additives, including preservatives and/or colorants, which may be present to improve the shelf-life and/or appearance of the cleaning products.

One approach to meeting that demand relies upon the formulation of HI&I compositions containing, to the fullest extent possible, naturally occurring products which are known to be safe for the consumer.

The use of natural colors in HI&I products, although often suggested, is presently restricted to caramel and burnt sugar—because the majority of natural colors are insoluble in water and/or lack sufficient stability to pH, temperature, or light for an acceptable shelf-life of the HI&I product.

The present invention generally aims to solve these problems and to provide HI&I compositions comprising natural colors wherein the natural colors are sufficiently stable to pH, temperature, or light for an acceptable HI&I product shelf-life.

Whilst the encapsulation of natural colors with a naturally occurring or synthetic polymer is known in the food industry as well as in the dyeing industry, the encapsulated natural colors lack sufficient pH, temperature, or light stability for use in HI&I compositions and products.

Accordingly the present invention throughout its aspects provides for the use of an encapsulated natural color in or suitable for use in a household, industrial or institutional (HI&I) product or a cosmetic product, or an encapsulated natural color or an encapsulated natural color composition, or a method for the production of an encapsulated natural colour or a method for producing a HI&I product comprising an encapsulated natural colour, wherein the encapsulated natural color is stable or soluble in water and/or oil, and has enhanced stability in the household, industrial or institutional (HI&I) product or a cosmetic product. The encapsulated natural colour may have one or more of enhanced stability to pH, temperature, or light (e.g. solar or UV radiation) for an acceptable HI&I product or cosmetic product shelf-life.

Particularly, for all aspects of the invention the encapsulated natural colour may be stable to simulated solar irradiation. The solar irradiation may be at 765 W/m² (SI unit, J/m² s) in accordance with International Commission on Illumination 85 (1989, Table 4, 3 mm window glass) reference sun. The solar irradiation may be for a period of between 8 hours to 16 hours, for example, 10 hours or 12 hours or 14 hours. The encapsulated natural color is for coloring a household, industrial or institutional (HI&I) product or a cosmetic product.

Particularly, for all aspects of the invention the encapsulated natural colour may be stable at pH ranging from acidic, as found in toilet cleaning products for example (pH of 1-4, more typically pH 1-2), to basic, as found in liquid detergents (pH 8-12, more typically pH 9-11) for up to around 6 months.

Particularly, for all aspects of the invention the encapsulated natural colour may be stable to temperatures typically encountered during transportation and storage of HI&I products: −20° C. to 60° C., more typically in the range 5-40° C., for up to about 6 months, or more typically up to about 1 month.

Whilst solar radiation may be mentioned below with specific aspects of the invention, the herein described encapsulated natural colors, methods and uses may also or alternative provide the above described pH or temperature stability or enhanced solubility, and may define those specific aspects of the invention as well as or instead of the so written stability to simulated solar irradiation.

As used herein the expression "stable" means that the encapsulated natural color following this exposure has a delta E value (in the CIE L*a*b color formula) as compared to the encapsulated natural color prior to the exposure of less than 10, preferably less than 5 and most preferably less than 3 or less than 2.

The exposure to solar irradiation described throughout may, for example, be carried out in an Atlas Suntest® CPS+ benchtop apparatus (Atlas Material Testing Solutions, Linsengericht, Germany) in accordance with Filter system C (3 mm window glass). The sample chamber temperature and surface temperature (black standard temperature according to ISO 4892-1) may be set respectively to 30° C. and 35° C. The relative humidity of the sample chamber may be about 37% to 38%.

The apparatus contains a Xenon lamp light source and simulates weathering by solar radiation through window glass whereby the light dose (at wavelengths of 300 nm to 800 nm) over the exposure time can be correlated with direct sunlight exposure at sea level in Northern Europe. The selection of power density 765 W/m² provides a light dose which can be correlated with days of this direct sunlight exposure (for example, 22 MJ/m² over 8 hours corresponding with 8 days).

Note that the exposure may also be consistent with ASTM International standard G 151-00.

Note further that for all aspects of the invention the expression "encapsulated natural color" refers to a natural color encapsulated, at least in part, by one or more of an encapsulating material. Preferably, the natural color is wholly encapsulated within one or more of an encapsulating material. Preferably the encapsulating material is also a natural material, so all components are naturally occurring, which has benefits.

The encapsulated natural colors for all aspects of the invention may be prepared using any suitable technique for encapsulating naturally occurring dyes or pigments. These techniques may include those known for the preparation of simple emulsions comprising single walled structures or for the preparation of more complex emulsions comprising two walled (bilaminar) or three walled (trilaminar) structures.

Accordingly, in a first aspect, the present invention provides for the use of an encapsulated natural color for coloring a household, industrial or institutional (HI&I) product or a cosmetic product, wherein the encapsulated natural color is stable in water to simulated solar irradiation at 765 W/m2 (SI unit, J/m2 s) in accordance with International Commission on Illumination 85 (1989, Table 4, 3 mm window glass) reference sun for a period of between 8 hours to 16 hours, for example, 10 hours or 12 hours or 14 hours. All features described above and below as applicable to the first aspect of the invention are envisioned as applicable to all further aspects of the invention described herein.

The encapsulating material may comprise any suitable material which, at least in part, encapsulates the natural color and in doing so is substantially transparent to visible light (low absorbing) but highly or moderately absorbing of UV light (without significant chemical degradation thereof).

The encapsulating material may additionally behave as an antioxidant which scavenges free radicals generated, for example, by the action of visible and UV light, in the HI&I composition or product.

Preferably, the encapsulating material comprises a naturally occurring material although synthetic materials may also be used. The encapsulating material may, in particular, be a naturally occurring or synthetic polymer, oligomer or a small molecule.

The encapsulating material may, in particular, be classified as a Carbohydrate, a Protein, a Synthetic polymer, a Natural Gum or a silica-based material. Examples of Carbohydrates include cyclodextrin and Maltodextrin. Examples of Protein include Ferritin, Pectin and Sodium Caseinate. Examples of Synthetic polymers include PMMA [Poly(methyl methacrylate)]. Examples of Natural Gums include Gum Arabic, Guar Gum and Xanthan Gum. Examples of silicon dioxides include silica.

The encapsulating material may, in particular, comprise one or more of a rosin or a rosin derivative or polymer, a terpene, a natural or synthetic phenol (including polyphenols), or a resin (including a water-borne resin or a solvent-borne resin), a monosaccharide, an oligosaccharide or a polysaccharide, a protein or glycoprotein, a silicate, a silane and a natural or synthetic wax. Preferably, the encapsulating material comprises two or more of these materials wherein the different materials absorb UV light of different wavelengths whereby to absorb at least a major part of the spectrum of UV light in the simulated solar irradiation.

These materials may be used in combination with one or more materials used for encapsulation of natural dyes in the food industry—provided that the encapsulating material has the requisite stability to the simulated solar irradiation.

Accordingly, the encapsulating material may comprise a combination of one or more of a rosin or rosin derivative or polymer, a terpene, a natural or synthetic phenol (including polyphenols), or a resin (including a water-borne resin or a solvent-borne resin) with one or more of a monosaccharide, oligosaccharide or polysaccharide (for example, a maltodextrin or a cyclodextrin or a starch), a protein or glycoprotein, a silicate, an organic silane and a natural or synthetic wax, or combinations thereof.

Preferably the encapsulated natural colour may comprise i) a first encapsulating material comprising a salt of wood rosin, and a second encapsulating material comprising glycerol ester of wood rosin; ii) a first encapsulating material comprising gum arabic, a second encapsulating material comprising maltodextrin, and a third encapsulating material comprising modified starch; iii) a first encapsulating material comprising cyclodextrin, a second encapsulating material comprising Gum Rosin Ester, and a third encapsulating material comprising gum acacia; or iv) a first encapsulating material comprising Phenylaminopropyl tetramethoxysilane, and a second encapsulating material comprising Gum Arabic.

The combination may, in particular, provide for ease of handling and/or preparation of the encapsulated natural colors. The combination may also exhibit a synergistic effect in that the visible and UV light stability of the encapsulating material is markedly better than can be expected by summing the visible and UV light stabilities of the encapsulating material comprising solely one or other of these materials in the relevant proportions. Preferably, the encapsulating material comprises two or more of these materials wherein the different materials absorb UV light at different wavelengths whereby to absorb at least a major part of the spectrum of UV light in the simulated solar irradiation.

The encapsulating materials may, in particular, provide that the encapsulated natural colors are water dispersible when otherwise they may not be.

The encapsulated natural colors may further comprise one or more water, an organic solvent (polar or non-polar), an ionic or non-ionic surfactant (naturally occurring or synthetic), a polyvalent metal or a salt thereof, a mordant, and a coupling component (linking moiety) which may be used with the encapsulating material for the encapsulation.

Suitable anionic surfactants include, but are not limited to, alkyl sulfates, alkyl ether sulfates, alkyl aryl sulfonates (for example, a linear alkyl benzene sulfonate), α-olefin sulfonates, alkali metal or ammonium salts of alkyl sulfates, alkali metal or ammonium salts of alkyl ether sulfates, alkyl phosphates, silicone phosphates, alkyl glycerol sulfonates, alkyl sulfosuccinates, alkyl taurates, alkyl sarcosinates, acyl sarcosinates, sulfoacetates, alkyl phosphate esters, monoalkyl maleates, acyl isothionates, alkyl carboxylates, phosphate esters, sulfosuccinates, lignosulfonates and combinations thereof.

Other suitable anionic surfactants include sodium lauryl sulfate, sodium lauryl ether sulfate, ammonium lauryl sulfosuccinate, ammonium lauryl sulfate, ammonium lauryl ether sulfate, sodium dodecylbenzene sulfate, triethanolamine dodecylbenzene sulfate, sodium cocoyl isothionate, sodium lauroyl isothionate and sodium N-lauryl sarcosinate.

Suitable non-ionic surfactants include, but are not limited to, mono- and di-alkanolamides, amine oxides, alkyl polyglucosides, ethoxylated silicones, ethoxylated alcohols, ethoxylated carboxylic acids, ethoxylated fatty acids, ethoxylated amines, ethoxylated amides, ethoxylated alkylolamides, ethoxylated alkylphenols, ethoxylated glyceryl esters, ethoxylated sorbitan esters, ethoxylated phosphate esters, block copolymers (for example, polyethylene glycol-polypropylene glycol block copolymers), glycol stearate, glyceryl stearate, alkyl polypentoside and combinations thereof.

Preferably, the surfactant is a naturally occurring surfactant or a surfactant derived or manufactured from one or more of a naturally occurring material (such as capryl glycoside).

Suitable organic solvents, polyvalent metals, mordants and coupling components will be apparent to those skilled in the art. The metals that may be used include aluminium, iron, copper, and chromium although other metals forming a lake or co-ordination complex with the natural color and/or the encapsulating material may be used. The coupling components which may be used include formaldehyde, glyoxal, silanes and soluble proteins.

The encapsulated natural colors may be prepared as water-based or oil-based emulsions—which may be used directly in an HI&I composition or product.

Preferably, however, the encapsulated natural colors are prepared by spray (or otherwise) drying the water-based emulsions. The spray dried emulsions provide encapsulated natural colors which have better visible and UV light stability as compared to encapsulated natural colors which are prepared as water-based emulsions.

The encapsulated natural colors may be used in amounts comprising between 0.01 wt/wt % and 1.00 wt/wt %, for example, 0.1 wt/wt %, 0.2 wt/wt % or 0.3 wt/wt % of the HI&I composition or product.

As noted above, the encapsulated natural colors may be stable to acid and/or alkaline conditions (in particular to pHs between 2.0 and 10.0, for example, to pHs above 2.0 and below or equal to 7.0 or above 7.0 and below or equal to 9.0) for 6 months or more and/or stable to temperatures between $-20°$ C. to $60°$ C., more typically in the range 5-40° C., in particular, to temperatures between $25°$ C. and $40°$ C. for 1 month or more.

In a preferred use, the encapsulated natural colour comprises a two wall (bilaminar) structure in which a first wall comprises an encapsulating material comprising a salt of wood rosin, and a second wall comprises an encapsulating material comprising glycerol ester of wood rosin.

The encapsulated natural color may comprise a natural color provided by one or more of an extract or a modified extract obtained from a lichen, a microbe, a fungus, a plant or an animal. The natural color may be a natural dye or pigment and, in particular, an organic or an inorganic dye.

The natural color may, in particular, comprise a natural dye which is not used in the food industry, such as alkanet, lac, cutch, weld, pomegranate skin, logwood, indigo, henna, osage, madder, or sequoia.

Alternatively, or additionally, the natural color may comprise one or more of a natural food dye or pigment obtained from a plant or an animal, such as black or purple carrot, blue fruit juice color, blue shade, vegetable juice colors, elderberry, hibiscus, purple sweet potato, red cabbage, red radish, beet juice, annatto extract, paprika, red carmine, beta-carotene, apocarotenol, lycopene, carthamus, copper chlorophyll, chlorophyll, copper chlorophyllin, chlorophyllin, turmeric (curcumin), caramel color, blue spirulina extract, apple extract, riboflavin, and lutein.

In a preferred use, the encapsulated natural color comprises one or more of indigo, madder extract, copper chlorophyll or copper chlorophyllin.

In a second aspect, the present invention provides an encapsulated natural color which is stable in water to simulated solar irradiation. The solar irradiation may be at 765 W/m² in accordance with International Commission on Illumination 85 (1989, Table 4, 3 mm window glass) reference sun. The solar irradiation may be for a period of between 8 hours to 16 hours, for example, 10 hours or 12 hours or 14 hours.

The encapsulated natural color may be comprised as a water-based or oil-based emulsion. Alternatively, the encapsulated natural color may be comprised as a solid. Preferably, the encapsulated natural color is a solid obtained by spray (or other) drying a water-based emulsion.

As mentioned above, the spray dried emulsions provide encapsulated natural colors which have better visible and UV light stability as compared to encapsulated natural colors prepared as water-based emulsions.

The encapsulating material may comprise any suitable material which, at least in part, encapsulates the natural color and in doing so is substantially transparent to visible light but highly or moderately absorbing of UV light (without chemical degradation thereof).

The encapsulating material may additionally behave as an antioxidant which scavenges free radicals generated, for example, by the action of visible and UV light, in the HI&I composition or product.

Preferably, the encapsulating material comprises a naturally occurring material although synthetic materials may also be used. The encapsulating material may, in particular, be a naturally occurring or synthetic polymer, oligomer or small molecule.

The encapsulating material may, in particular, be classified as a Carbohydrate, a Protein, a Synthetic polymer, a Natural Gum or a silica-based material. Examples of Carbohydrates include cyclodextrin and Maltodextrin. Examples of Protein include Ferritin, Pectin and Sodium Caseinate. Examples of Synthetic polymers include PMMA [Poly(methyl methacrylate)]. Examples of Natural Gums include Gum Arabic, Guar Gum and Xanthan Gum. Examples of silicon dioxides include silica.

The encapsulating material may, in particular, comprise one or more of a rosin or rosin derivative or polymer, a terpene, a natural or synthetic phenol, or a resin (including a water-borne resin or a solvent-borne resin), a monosaccharide, an oligosaccharide or a polysaccharide, a protein or glycoprotein, a silicate, a silane and a natural or synthetic wax, or combinations thereof. Preferably, the encapsulating material comprises two or more of these materials wherein the different materials absorb UV light at different wavelengths whereby to absorb at least a major part of the spectrum of UV light in the simulated solar irradiation.

These materials may be used in combination with one or more materials used for encapsulation of natural dyes in the food industry—provided that the encapsulating material has the requisite stability to the simulated solar irradiation.

Accordingly, the encapsulating material may comprise a combination of one or more of a rosin or rosin derivative or polymer, a terpene, a natural or synthetic phenol (including polyphenols), or a resin (including a water-borne resin or a solvent-borne resin with one or more of a monosaccharide, oligosaccharide or polysaccharide (for example, a maltodextrin or a cyclodextrin or a starch), a protein or glycoprotein, a silicate, an organic silane and a natural or synthetic wax.

Preferably the encapsulated natural colour may comprise i) a first encapsulating material comprising a salt of wood rosin, and a second encapsulating material comprising glycerol ester of wood rosin; ii) a first encapsulating material comprising gum arabic, a second encapsulating material comprising maltodextrin, and a third encapsulating material comprising modified starch; iii) a first encapsulating material comprising cyclodextrin, a second encapsulating material comprising Gum Rosin Ester, and a third encapsulating material comprising gum acacia; or iv) a first encapsulating material comprising Phenylaminopropyl tetramethoxysilane, and a second encapsulating material comprising Gum Arabic.

The combination may, in particular, provide for ease of handling and/or preparation of the encapsulated natural colors. The combination may also exhibit a synergistic effect in that the visible and UV light stability of the encapsulating material is markedly better than can be expected by summing the visible and UV light stabilities of the encapsulating material comprising solely one or other of these materials in the relevant proportions. Preferably, the encapsulating material comprises two or more of these materials wherein the different materials absorb UV light at different wavelengths whereby to absorb at least a major part of the spectrum of UV light in the simulated solar irradiation.

The encapsulating materials may, in particular, provide that the encapsulated natural colors are water dispersible.

The encapsulated natural colors may further comprise one or more an organic solvent (polar or non-polar), an ionic or non-ionic surfactant (naturally occurring or synthetic), a polyvalent metal or a salt thereof, a mordant, and a coupling component (linking moiety) which may be used with the encapsulating material for the encapsulation.

Suitable surfactants include those mentioned above. Suitable organic solvents, polyvalent metals, mordants and coupling components will be apparent to those skilled in the art. The metals that may be used include aluminium, iron, copper, and chromium although other metals forming a lake or co-ordination complex with the natural color and/or the encapsulating material may be used. The coupling components which may be used include formaldehyde, glyoxal, silanes and soluble proteins.

The encapsulated natural colors may be prepared as water-based or oil-based emulsions or as solids obtained by drying the emulsions. The emulsions and solids may be used directly in the preparation of an HI&I composition or added directly to an HI&I product.

The encapsulated natural colors may be used in amounts comprising between 0.01 wt/wt % and 1.00 wt/wt %, for example, 0.1 wt/wt %, 0.2 wt/wt % or 0.3 wt/wt % of the HI&I composition or product.

The encapsulated natural colors may be stable to acid and/or alkaline conditions (in particular to pHs between 2.0 and 10.0, for example, to pHs above 2.0 and below or equal to 7.0 or above 7.0 and below or equal to 9.0) for 6 months or more and stable to temperatures between −20° C. to 60° C., more typically in the range 5-40° C., in particular, to temperatures between 25° C. and 40° C. for 1 month or more.

In a preferred embodiment, the encapsulated natural colour comprises a two wall (bilaminar) structure in which a first wall comprises an encapsulating material comprising a salt of wood rosin, and a second wall comprising an encapsulating material comprising glycerol ester of wood rosin.

The encapsulated natural color may comprise a natural color provided by one or more of an extract or a modified extract obtained from a lichen, a microbe, a fungus, a plant or an animal. The natural color may be a natural dye or pigment and, in particular, an organic or an inorganic dye.

The natural color may, in particular, comprise a natural dye which is not used in the food industry, such as alkanet, lac, cutch, weld, pomegranate skin, logwood, indigo, henna, osage, madder, or sequoia.

Alternatively, or additionally, the natural color may comprise one or more a natural food dye or pigment obtained from a plant or an animal, such as black or purple carrot, blue fruit juice color, blue shade, vegetable juice colors, elderberry, hibiscus, purple sweet potato, red cabbage, red radish, beet juice, annatto extract, paprika, red carmine, beta-carotene, apocarotenol, lycopene, carthamus, copper chlorophyll, chlorophyll, copper chlorophyllin, chlorophyllin, turmeric (curcumin), caramel color, blue spirulina extract, apple extract, riboflavin, and lutein.

In a preferred embodiment, the encapsulated natural color comprises one or more of indigo, madder extract, copper chlorophyll or copper chlorophyllin.

In a third aspect, the present invention provides a method for the production of an encapsulated natural color comprising mixing a natural color with a water-based or oil-based solution of one or more of an encapsulating material whereby to obtain an encapsulated natural color wherein the encapsulated natural color is stable in water to simulated solar irradiation. The solar irradiation may be at 765 W/m$^2$ in accordance with International Commission on Illumination 85 (1989, Table 4, 3 mm window glass) reference sun. The solar irradiation may be for a period of between 8 hours to 16 hours, for example, 10 hours or 12 hours or 14 hours.

The method may employ any suitable material which, at least in part, encapsulates the natural color and in doing so is substantially transparent to visible light but highly or moderately absorbing of UV light (without significant chemical degradation).

The encapsulating material may additionally behave as an antioxidant which scavenges free radicals generated, for example, by the action of visible and UV light, in the HI&I composition or product.

Preferably, the encapsulating material comprises a naturally occurring material although synthetic materials may also be used. The encapsulating material may, in particular, be a naturally occurring or synthetic polymer, oligomer or small molecule.

The encapsulating material may, in particular, be classified as a Carbohydrate, a Protein, a Synthetic polymer, a Natural Gum or a silica-based material. Examples of Carbohydrates include cyclodextrin and Maltodextrin. Examples of Protein include Ferritin, Pectin and Sodium Caseinate. Examples of Synthetic polymers include PMMA [Poly(methyl methacrylate)]. Examples of Natural Gums include Gum Arabic, Guar Gum and Xanthan Gum. Examples of silicon dioxides include silica.

The method may, in particular, employ as encapsulating material one or more of a rosin or rosin derivative or polymer, a terpene, a natural or synthetic phenol (including polyphenols), or a resin (including a water-borne resin or a solvent-borne resin), a monosaccharide, an oligosaccharide or a polysaccharide, a protein or glycoprotein, a silicate, a silane and a natural or synthetic wax, or combinations thereof. Preferably, the encapsulating material comprises two or more of these materials wherein the different materials absorb UV light of different wavelengths whereby to absorb at least a major part of the spectrum of UV light in the simulated solar irradiation.

These materials may be used in combination with one or more materials used for encapsulation of natural dyes in the food industry—provided that the encapsulating material has the requisite stability to the simulated solar irradiation.

Accordingly, the method may employ as encapsulating material a combination of one or more of a rosin or rosin derivative or polymer, a terpene, a natural or synthetic phenol (including polyphenols), or a resin (including a water-borne resin or a solvent-borne resin with one or more of a monosaccharide, oligosaccharide or polysaccharide (for example, maltodextrin or cyclodextrin or a starch), a protein or glycoprotein, a polysaccharide (in particular a sugar or starch), a silicate, an organic silane and a natural or synthetic wax, or combinations thereof.

Preferably the encapsulated natural colour may comprise i) a first encapsulating material comprising a salt of wood rosin, and a second encapsulating material comprising glycerol ester of wood rosin; ii) a first encapsulating material comprising gum arabic, a second encapsulating material comprising maltodextrin, and a third encapsulating material comprising modified starch; iii) a first encapsulating material comprising cyclodextrin, a second encapsulating material comprising Gum Rosin Ester, and a third encapsulating material comprising gum acacia; or iv) a first encapsulating material comprising Phenylaminopropyl tetramethoxysilane, and a second encapsulating material comprising Gum Arabic.

The combination may, in particular, provide for ease of handling and/or preparation of the encapsulated natural colors. The combination may also exhibit a synergistic effect in that the visible and UV light stability of the encapsulating material is markedly better than can be expected by summing the visible and UV light stabilities of the encapsulating material comprising solely one or other of these materials in the relevant proportions. Preferably, the encapsulating material comprises two or more of these materials wherein the different materials absorb UV light at different wavelengths whereby to absorb at least a major part of the spectrum of UV light in the simulated solar irradiation.

The method may, in particular, provide that the encapsulated natural colors are water dispersible.

The method may further employ as encapsulating materials one or more an organic solvent (polar or non-polar), an ionic or non-ionic surfactant (naturally occurring or synthetic), a polyvalent metal or a salt thereof, a mordant, and a coupling component (linking moiety) which may be used with the encapsulating material for the encapsulation.

Suitable surfactants include those mentioned above. Suitable organic solvents, polyvalent metals, mordants and coupling components will be apparent to those skilled in the art. The metals that may be used include aluminium, iron, copper, and chromium although other metals forming a lake or co-ordination complex with the natural color and/or the encapsulating material may be used. The coupling components which may be used include formaldehyde, glyoxal, silanes and soluble proteins.

The method may further comprise drying, for example, spray-drying, the water-based emulsion to a solid. The solid may be used directly in the preparation of an HI&I composition. Alternatively, it may be reconstituted as an emulsion prior to use in the preparation of an HI&I composition. Of course, the solid or reconstituted emulsion may also be added directly to an existing HI&I product.

The encapsulated natural colors may be used in amounts comprising between 0.01 wt/wt % and 1.00 wt/wt %, for example, 0.1 wt/wt %, 0.2 wt/wt % or 0.3 wt/wt % of the HI&I composition or product.

The encapsulated natural colors may be stable to acid and/or alkaline conditions (in particular to pHs between 2.0 and 10.0, for example, to pHs above 2.0 and below or equal to 7.0 or above 7.0 and below or equal to 9.0) for 6 months or more and stable to temperatures between –20° C. to 60° C., more typically in the range 5-40° C., in particular, to temperatures between 25° C. and 40° C. for 1 month or more.

In a preferred embodiment, the method provides an encapsulated natural colour comprising a two wall (bilaminar) structure in which a first wall comprises an encapsulating material comprising a salt of wood rosin, and a second wall comprising an encapsulating material comprising glycerol ester of wood rosin.

The method may employ a natural color provided by one or more of an extract or a modified extract obtained from a lichen, a microbe, a fungus, a plant or an animal. The natural color may be a natural dye or pigment and, in particular, an organic or an inorganic dye.

The natural color may, in particular, comprise a natural dye which is not used in the food industry, such as alkanet, lac, cutch, weld, pomegranate skin, logwood, indigo, henna, osage, madder, or sequoia.

Alternatively, or additionally, the natural color may comprise one or more a natural food dye or pigment obtained from a plant or an animal, such as black or purple carrot, blue fruit juice color, blue shade, vegetable juice colors, elderberry, hibiscus, purple sweet potato, red cabbage, red radish, beet juice, annatto extract, paprika, red carmine, beta-carotene, apocarotenol, lycopene, carthamus, copper chlorophyll, chlorophyll, copper chlorophyllin, chlorophyllin, turmeric (curcumin), caramel color, blue spirulina extract, apple extract, riboflavin, and lutein.

In a preferred embodiment, the encapsulated natural color comprises one or more of indigo, madder extract, copper chlorophyll or copper chlorophyllin.

The encapsulated natural colors may be prepared as water-based or oil-based emulsions or solids and used directly in the production of an HI&I composition or added directly to an HI&I product.

In a fourth aspect, the present invention provides an HI&I composition or product comprising an encapsulated natural color is stable in water to simulated solar irradiation. The solar irradiation may be at 765 Watt in accordance with International Commission on Illumination 85 (1989, Table 4, 3 mm window glass) reference sun. The solar irradiation may be for a period of between 8 hours to 16 hours, for example, 10 hours or 12 hours or 14 hours. The encapsulated natural color can act as a colorant.

The HI&I composition or HI&I product may comprise an encapsulated natural color comprised as a dispersible water-based or oil-based emulsion.

The encapsulated natural color may comprise any suitable material which, at least in part, encapsulates the natural color and is substantially transparent to visible light but highly or moderately absorbing of UV light.

The encapsulating material may additionally behave as an antioxidant which scavenges free radicals generated, for example, by the action of visible and UV light, in the HI&I composition or product.

Preferably, the encapsulating material comprises a naturally occurring material although synthetic materials may also be used. The encapsulating material may, in particular, be a naturally occurring or synthetic polymer, oligomer or small molecule.

The encapsulating material may, in particular, be classified as a Carbohydrate, a Protein, a Synthetic polymer, a Natural Gum or a silica-based material. Examples of Carbohydrates include cyclodextrin and Maltodextrin. Examples of Protein include Ferritin, Pectin and Sodium Caseinate. Examples of Synthetic polymers include PMMA [Poly(methyl methacrylate)]. Examples of Natural Gums include Gum Arabic, Guar Gum and Xanthan Gum. Examples of silicon dioxides include silica.

The encapsulating material may, in particular, comprise one or more of a rosin or rosin derivative or polymer, a terpene, a natural or synthetic phenol (including polyphenols), or a resin (including a water-borne resin or a solvent-borne resin), a monosaccharide, an oligosaccharide or a polysaccharide, a protein or glycoprotein, a silicate, a silane and a natural or synthetic wax, or combinations thereof. Preferably, the encapsulating material comprises two or more of these materials wherein the different materials absorb UV light of different wavelengths whereby to absorb at least a major part of the spectrum of UV light in the simulated solar irradiation.

These materials may be used in combination with one or more materials providing transparent polymers used for encapsulation of natural dyes in the food industry—provided that the encapsulating material has the requisite stability to the solar irradiation.

Accordingly, the encapsulating material may comprise a combination of one or more of a rosin or rosin derivative or polymer, a terpene, a natural or synthetic phenol (including polyphenols), or a resin (including a water-borne resin or a solvent-borne resin with one or more of a monosaccharide, oligosaccharide or polysaccharide (for example, a maltodextrin or a cyclodextrin or a starch), a protein or glycoprotein, a polysaccharide (in particular a sugar or starch), a silicate, an organic silane and a natural or synthetic wax, or combinations thereof.

Preferably the encapsulated natural colour may comprise i) a first encapsulating material comprising a salt of wood rosin, and a second encapsulating material comprising glycerol ester of wood rosin; ii) a first encapsulating material comprising gum arabic, a second encapsulating material comprising maltodextrin, and a third encapsulating material comprising modified starch; iii) a first encapsulating material comprising cyclodextrin, a second encapsulating material comprising Gum Rosin Ester, and a third encapsulating material comprising gum acacia; or iv) a first encapsulating material comprising Phenylaminopropyl tetramethoxysilane, and a second encapsulating material comprising Gum Arabic.

As mentioned above, the combination may provide for ease of handling and/or preparation of the encapsulated natural colors. The combination may also exhibit a synergistic effect in that the UV stability of the encapsulating material is markedly better than can be expected by summing the UV stabilities of the encapsulating material comprising solely one or other of these materials in the relevant proportions. Preferably, the encapsulating material comprises two or more of these materials wherein the different materials absorb UV light at different wavelengths whereby to absorb at least a major part of the spectrum of UV light in the simulated solar irradiation.

The encapsulated natural colors may further comprise one or more an organic solvent (polar or non-polar), an ionic or non-ionic surfactant (naturally occurring or synthetic), a polyvalent metal or a salt thereof, a mordant, and a coupling component (linking moiety) which may be used with the encapsulating material for the encapsulation.

Suitable surfactants include those mentioned above. Suitable organic solvents, polyvalent metals, mordants and coupling components will be apparent to those skilled in the art. The metals that may be used include aluminium, iron, copper, and chromium although other metals forming a lake or co-ordination complex with the natural color and/or the encapsulating material may be used. The coupling components which may be used include formaldehyde, glyoxal, silanes and soluble proteins.

The encapsulated natural colors may be used in amounts comprising between 0.01 wt/wt % and 1.00 wt/wt %, for example, 0.1 wt/wt %, 0.2 wt/wt % or 0.3 wt/wt % of the HI&I composition or product.

The encapsulated natural colors may be stable to acid and/or alkaline conditions (in particular to pHs between 2.0 and 10.0, for example, to pHs above 2.0 and below or equal to 7.0 or above 7.0 and below or equal to 9.0) for 6 months or more and stable to temperatures between −20° C. to 60° C., more typically in the range 5-40° C., in particular, to temperatures between 25° C. and 40° C. for 1 month or more.

In a preferred embodiment, the encapsulated natural colour comprises a two wall (bilaminar) structure in which a first wall comprises an encapsulating material comprising a salt of wood rosin, and a second wall comprising an encapsulating material comprising glycerol ester of wood rosin.

The encapsulated natural color may comprise a natural color provided by one or more of an extract or a modified extract obtained from a lichen, a microbe, a fungus, a plant or an animal. The natural color may be a natural dye or pigment and, in particular, an organic or an inorganic dye.

The natural color may, in particular, comprise a natural dye or pigment which is not used in the food industry, such as alkanet, lac, cutch, weld, pomegranate skin, logwood, indigo, henna, osage, madder, or sequoia.

Alternatively, or additionally, the natural color may comprise one or more a natural food dye or pigment obtained from a plant or an animal, such as black or purple carrot, blue fruit juice color, blue shade, vegetable juice colors, elderberry, hibiscus, purple sweet potato, red cabbage, red radish, beet juice, annatto extract, paprika, red carmine, beta-carotene, apocarotenol, lycopene, carthamus, copper chlorophyll, chlorophyll, copper chlorophyllin, chlorophyllin, turmeric (curcumin), caramel color, blue spirulina extract, apple extract, riboflavin, and lutein.

In a preferred embodiment, the encapsulated natural color comprises one or more of indigo, madder extract, copper chlorophyll or copper chlorophyllin.

In preferred embodiments, the HI&I composition or product is a cleaning product, for example, a hand dish wash, a fabric conditioner or maintainer, a toilet cleaner, a liquid detergent, a multi-action spray, an all-purpose cleaner, etc. It may also be a laundry product such as a fabric conditioner or softener etc. The HI&I composition or product can be a home care product.

In a fifth aspect, the present invention provides a method for providing a colored HI&I composition or product, comprising formulating the HI&I composition or product with an encapsulated natural color which is stable in water to simulated solar irradiation. The solar irradiation may be at 765 Watt in accordance with International Commission on Illumination 85 (1989, Table 4, 3 mm window glass) reference sun. The solar irradiation may be for a period of between 8 hours to 16 hours, for example, 10 hours or 12 hours or 14 hours.

The encapsulated natural color may be comprised as a dispersible water-based or oil-based emulsion. Alternatively, the encapsulated natural color may be comprised as a solid. Preferably, the encapsulated natural color is a solid obtained by spray (or other) drying a water-based emulsion. As mentioned above, the spray dried emulsions provide encapsulated natural colors which have better visible light and UV stability as compared to encapsulated natural colors prepared as water-based emulsions.

The encapsulating material may comprise any suitable material which, at least in part, encapsulates the natural color and is substantially transparent to visible light but highly or moderately absorbing of UV light.

The encapsulating material may additionally behave as an antioxidant which scavenges free radicals generated, for example, by the action of visible and UV light, in the HI&I composition or product.

Preferably, the encapsulating material comprises a naturally occurring material although synthetic materials may also be used. The encapsulating material may, in particular, be a naturally occurring or synthetic polymer, oligomer or small molecule.

The encapsulating material may, in particular, be classified as a Carbohydrate, a Protein, a Synthetic polymer, a Natural Gum or a silica-based material. Examples of Carbohydrates include cyclodextrin and Maltodextrin. Examples of Protein include Ferritin, Pectin and Sodium Caseinate. Examples of Synthetic polymers include PMMA [Poly(methyl methacrylate)]. Examples of Natural Gums include Gum Arabic, Guar Gum and Xanthan Gum. Examples of silicon dioxides include silica.

The encapsulating material may, in particular, comprise one or more of a rosin or rosin derivative or polymer, a terpene, a natural or synthetic phenol, or a resin (including a water-borne resin or a solvent-borne resin), a monosaccharide, an oligosaccharide or a polysaccharide, a protein or glycoprotein, a silicate, a silane and a natural or synthetic wax, or combinations thereof. Preferably, the encapsulating material comprises two or more of these materials wherein the different materials absorb UV light of different wavelengths whereby to absorb at least a major part of the spectrum of UV light in the simulated solar irradiation.

These materials may be used in combination with one or more materials used for encapsulation of natural dyes in the food industry—provided that the encapsulating material has the requisite stability to the simulated solar irradiation.

Accordingly, the encapsulating material may comprise a combination of one or more of a rosin or rosin derivative or polymer, a terpene, a natural or synthetic phenol (including polyphenols), or a resin (including a water-borne resin or a solvent-borne resin with one or more of a monosaccharide, oligosaccharide or polysaccharide (for example, a maltodextrin or a cyclodextrin or a starch), a protein or a glycoprotein, a polysaccharide (in particular a sugar or starch), a silicate, an organic silane and a natural or synthetic wax, or combinations thereof.

Preferably the encapsulated natural colour may comprise i) a first encapsulating material comprising a salt of wood rosin, and a second encapsulating material comprising glycerol ester of wood rosin; ii) a first encapsulating material comprising gum arabic, a second encapsulating material comprising maltodextrin, and a third encapsulating material comprising modified starch; iii) a first encapsulating material comprising cyclodextrin, a second encapsulating material comprising Gum Rosin Ester, and a third encapsulating material comprising gum acacia; or iv) a first encapsulating material comprising Phenylaminopropyl tetramethoxysilane, and a second encapsulating material comprising Gum Arabic.

The combination may, in particular, provide for ease of handling and/or preparation of the encapsulated natural colors. The combination may also exhibit a synergistic effect in that the UV stability of the encapsulating material is markedly better than can be expected by summing the UV stabilities of the encapsulating material comprising solely one or other of these materials in the relevant proportions.

The encapsulating materials may, in particular, provide that the encapsulated natural colors are water dispersible.

The encapsulated natural colors may further comprise one or more an organic solvent (polar or non-polar), an ionic or non-ionic surfactant (naturally occurring or synthetic), a polyvalent metal or a salt thereof, a mordant, and a coupling component (linking moiety) which may be used with the encapsulating material for the encapsulation.

Suitable surfactants include those mentioned above. Suitable organic solvents, polyvalent metals, mordants and coupling components will be apparent to those skilled in the art. The metals that may be used include aluminium, iron, copper, and chromium although other metals forming a lake or co-ordination complex with the natural color and/or the encapsulating material may be used. The coupling components which may be used include formaldehyde, glyoxal, silanes and soluble proteins.

The encapsulated natural colors may be used in amounts comprising between 0.01 wt/wt % and 1.00 wt/wt %, for example, 0.1 wt/wt %, 0.2 wt/wt % or 0.3 wt/wt % of the HI&I composition or product.

The encapsulated natural colors are preferably stable to acid and/or alkaline conditions (in particular to pHs between 2.0 and 10.0, for example, to pHs above 2.0 and below or equal to 7.0 or above 7.0 and below or equal to 9.0) for 6 months or more and stable to temperatures between −20° C. to 60° C., more typically in the range 5-40° C., in particular, to temperatures between 25° C. and 40° C. for 1 month or more.

In a preferred embodiment, the method employs an encapsulated natural colour comprising a two wall (bilaminar) structure in which a first wall comprises an encapsulating material comprising a salt of wood rosin, and a second wall comprising an encapsulating material comprising glycerol ester of wood rosin.

The encapsulated natural color may comprise a natural color provided by one or more of an extract or a modified extract obtained from a lichen, a microbe, a fungus, a plant or an animal.

The natural color may, in particular, comprise a natural dye or pigment which is not used in the food industry, such as alkanet, lac, cutch, weld, pomegranate skin, logwood, indigo, henna, osage, madder, or sequoia.

Alternatively, or additionally, the natural color may comprise one or more a natural food dye or pigment obtained from a plant or an animal, such as black or purple carrot, blue fruit juice color, blue shade, vegetable juice colors, elderberry, hibiscus, purple sweet potato, red cabbage, red radish, beet juice, annatto extract, paprika, red carmine, beta-carotene, apocarotenol, lycopene, carthamus, copper chlorophyll, chlorophyll, copper chlorophyllin, chlorophyllin, turmeric (curcumin), caramel color, blue spirulina extract, apple extract, riboflavin, and lutein.

In a preferred embodiment, the encapsulated natural color comprises one or more of indigo, madder extract, copper chlorophyll or copper chlorophyllin.

In embodiments, the HI&I composition or product is a cleaning product, for example, a hand dish wash, a fabric conditioner or maintainer, a toilet cleaner, a liquid detergent, a multi-action spray, an all-purpose cleaner, a drain cleaner etc. It may also be a laundry product such as a fabric conditioner or softener etc. The HI&I composition or product can be a home care product.

Note that features described in relation to any one aspect of the present invention are features which are described in relation to any other aspect of the present invention unless the context demands otherwise.

Figure 1B:
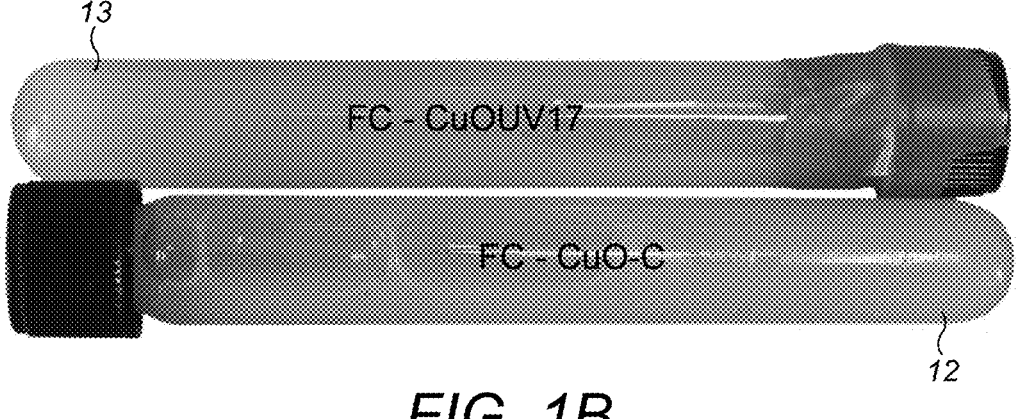
Figure 2C:
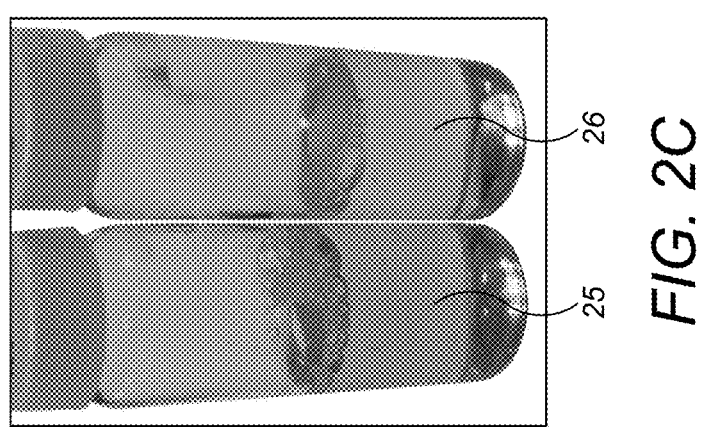
Figure 2B:
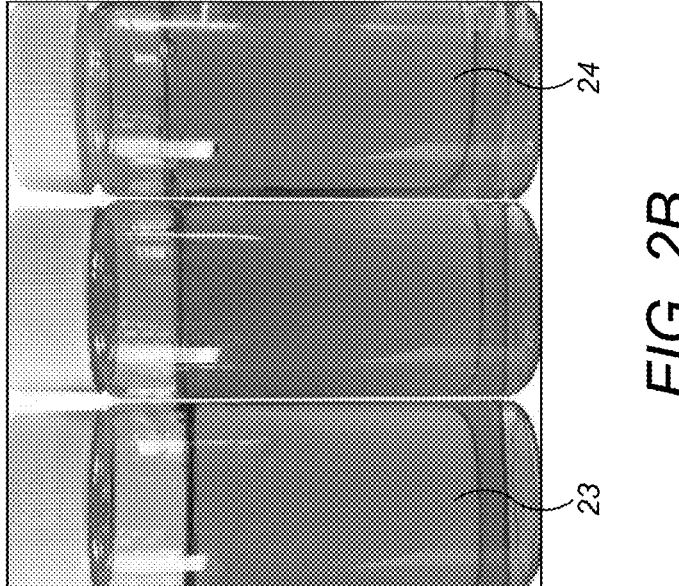
Figure 2A:
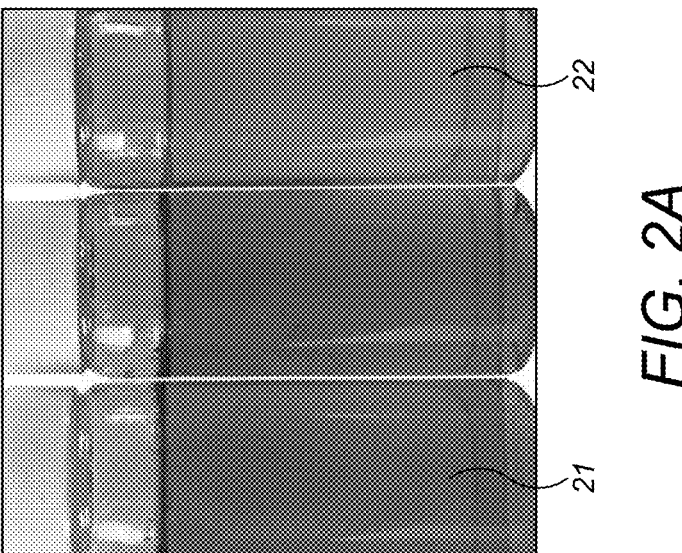
Figures 3A, 3B, 3C:
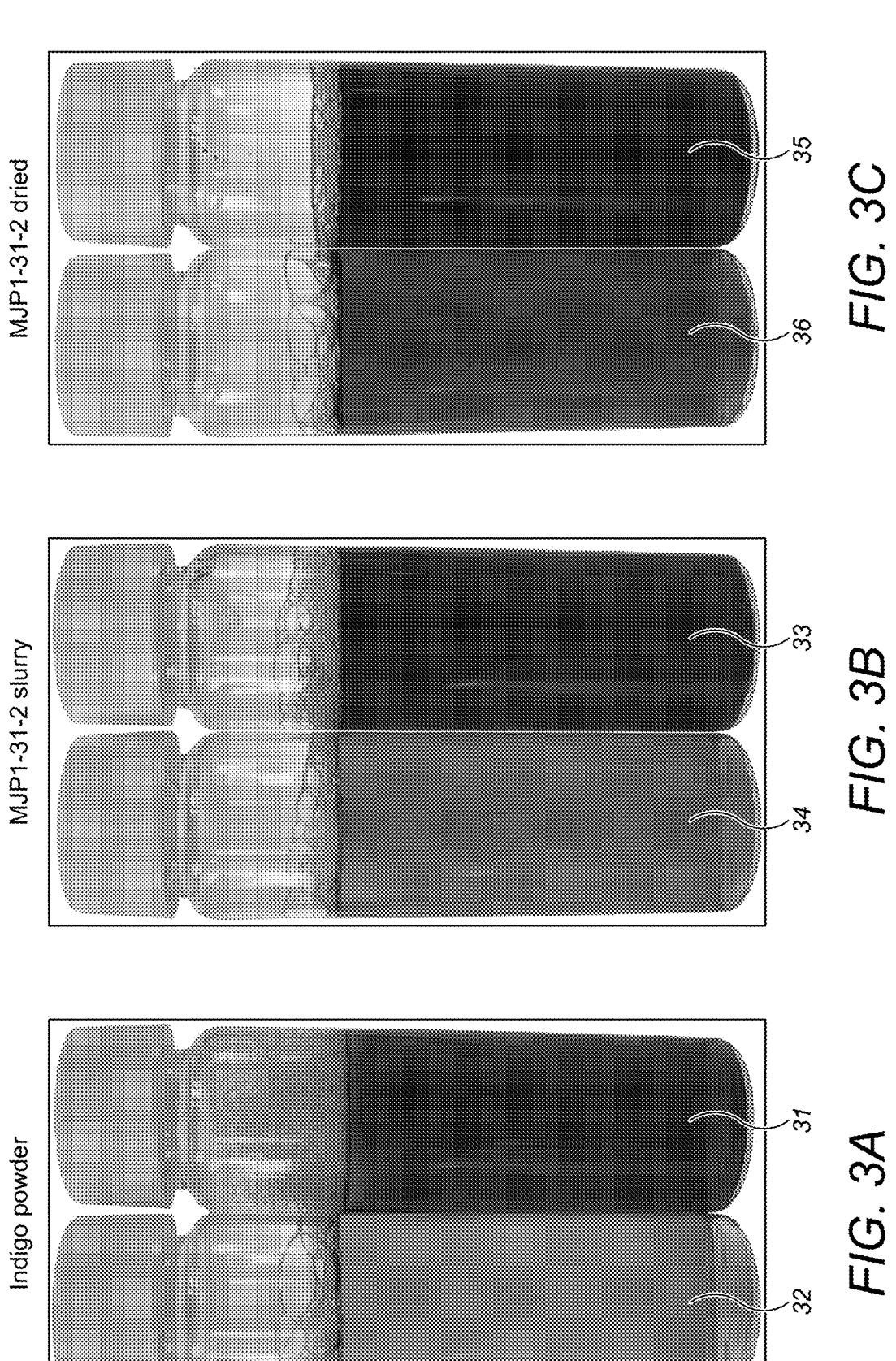

The present invention will now be described in more detail with reference to the following non-limiting examples and the accompanying drawings in which:

FIG. 1 are photographs showing the color fastness of encapsulated copper chlorophyll according to one embodiment of the present invention (FIG. 1A) in a fabric conditioner base to UV irradiation as compared to the color fastness of a suspension of copper chlorophyll (FIG. 1B) in the fabric conditioner base;

FIG. 2 are photographs showing the color fastness of encapsulated copper chlorophyll in a hand dish wash base according to one embodiment of the present invention (FIG. 2A) to UV irradiation as compared to the color fastness of copper chlorophyll encapsulated by maltodextrin in the hand dish wash (FIG. 2B) and the color fastness of a suspension of copper chlorophyll in the hand dish wash (FIG. 2C);

FIG. 3 are photographs showing the color fastness of encapsulated indigo in a hand dish wash base according to different embodiments of the present invention (FIGS. 3B and 3C) to UV irradiation as compared to the color fastness of a suspension of indigo powder in the hand wash (FIG. 3A).

Figures 4A, 4B, 4C:
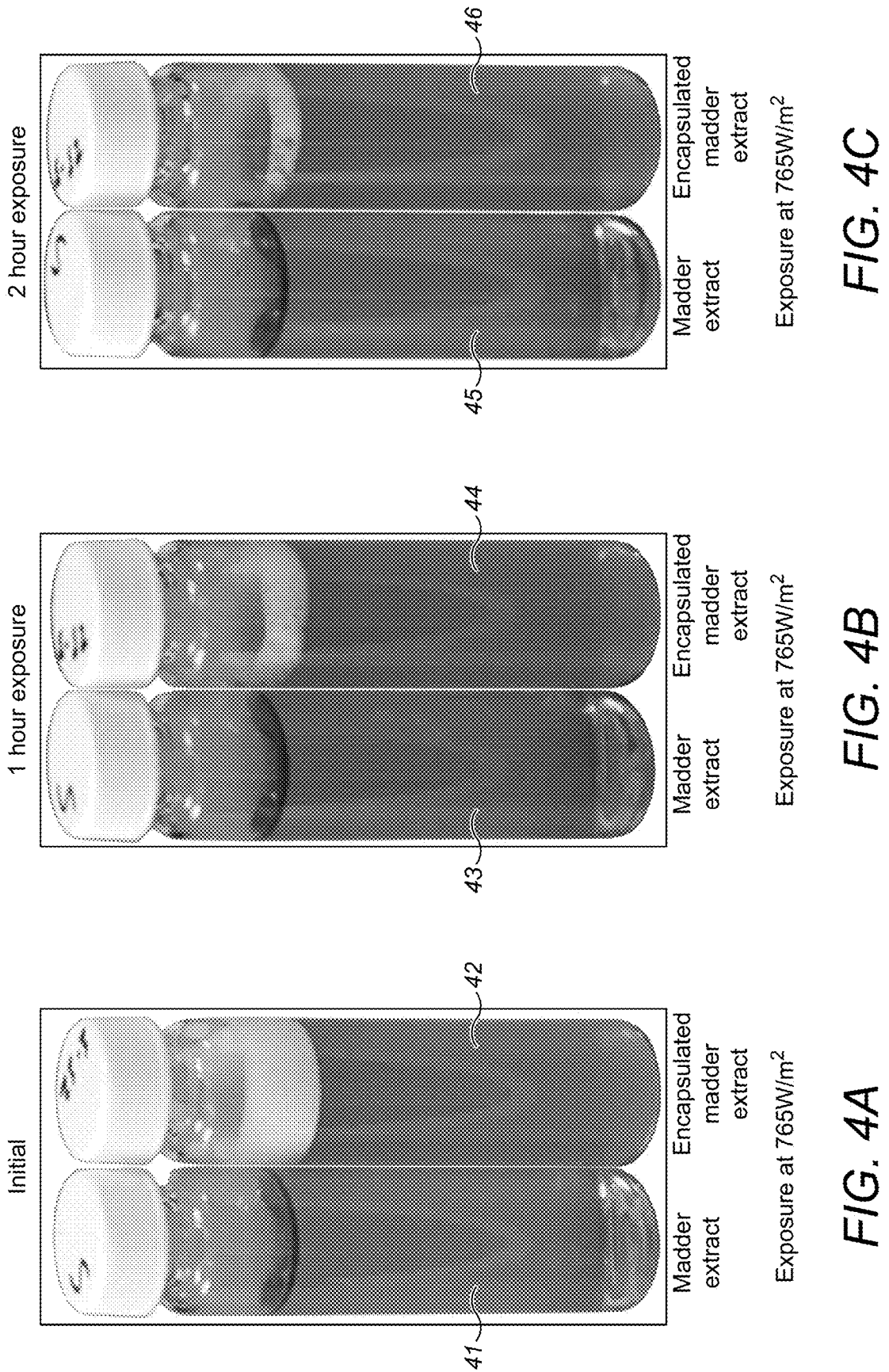
Figure 5B:
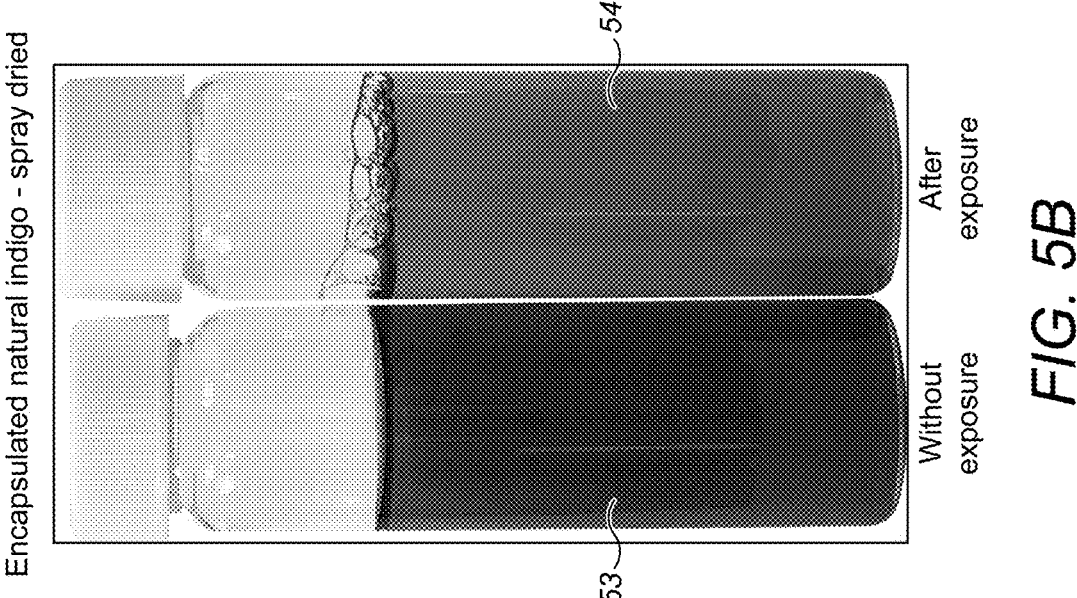
Figure 5A:
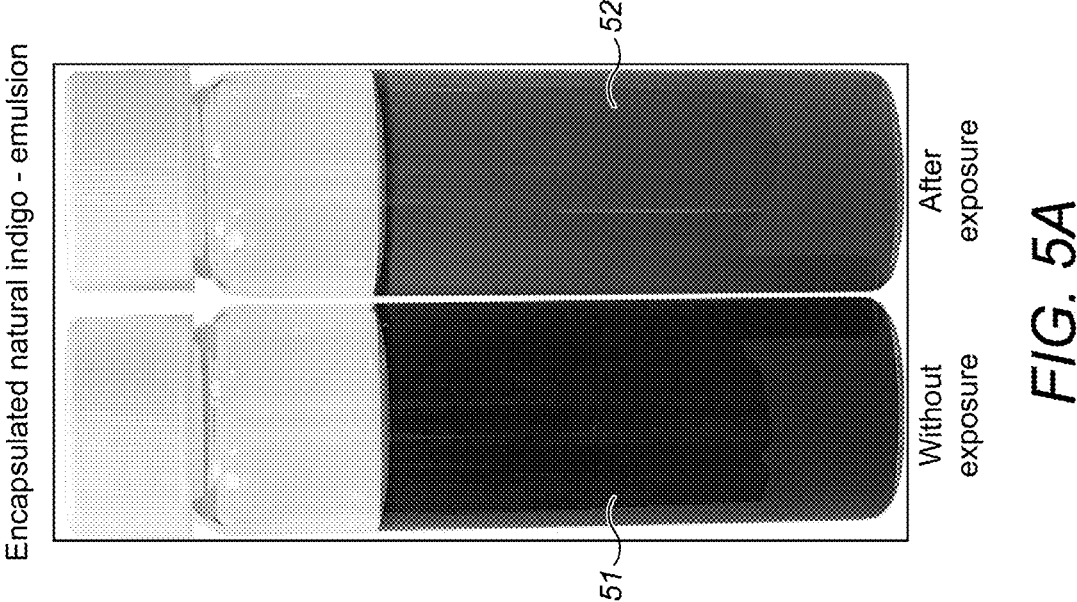

FIG. 4 are photographs showing the color fastness of encapsulated Madder extract in a hand dish wash base according to one embodiment of the present invention to UV irradiation, as compared to the color fastness of unencapsulated Madder extract; and FIG. 5 are photographs showing the color fastness of encapsulated natural indigo in a hand dish wash base according to different embodiments of the present invention (FIGS. 5A and 5B) to UV irradiation.

EXAMPLE 1

Encapsulated Copper Chlorophyll 1

An emulsion containing gum arabic (10 wt/wt %), maltodextrin (20 wt/wt %), modified starch (30 wt/wt %), copper chlorophyll (10 wt/wt %) and polysorbate 80 (1 wt/wt %) was made up in water (to 100 wt/wt %) by mixing using a Silverson high shear mixer at 3000 r.p.m. for 3 minutes. The emulsion was spray dried to a green powder and the powder dispersed in a fabric conditioner base.

The resulting fabric conditioner base containing encapsulated copper chlorophyll (hereinafter designated 1) was exposed to UV irradiation (300 nm to 400 nm) using an Atlas Suntest® CPS+ benchtop apparatus (Atlas Material Testing Solutions, Linsengericht, Germany) at 765 W/m² at 35° C. during a period of 14 hours. The color of the fabric conditioner base prior to, and following the exposure is shown in FIG. 1A.

A suspension of copper chlorophyll (10 wt/wt %) in the fabric conditioner base was exposed to similar UV irradiation. The color of the fabric conditioner base prior to, and following the exposure is shown in FIG. 1B.

As may be seen from FIG. 1A, the color of the fabric conditioner base containing the encapsulated copper chlorophyll following the UV irradiation 11 is essentially retained albeit with some loss of intensity as compared to the color of the fabric conditioner base prior to the irradiation 10.

TABLE 1

| Fabric conditioner Base | Color intensity Prior to Irradiation | Color Intensity After Irradiation |
| --- | --- | --- |
| Encapsulated copper | ++++ | ++-- |

TABLE 1-continued

| Fabric conditioner Base | Color intensity Prior to Irradiation | Color Intensity After Irradiation |
| --- | --- | --- |
| chlorophyll 1 | | |
| Unencapsulated copper chlorophyll | ++++ | ---- |
| Unencapsulated copper chlorophyllin | ++++ | ---- |

By contrast, as may be seen from FIG. 1B, the color of the fabric conditioner base containing the unencapsulated copper chlorophyll following the irradiation 13 is completely different as compared to the color the fabric conditioner base prior to the irradiation 12.

The outcomes of these irradiation tests are qualitatively outlined in the Table 1.

Note that the color of a fabric conditioner base containing dissolved copper chlorophyllin (as opposed to copper chlorophyll) following a similar irradiation is also completely different as compared to the color the fabric conditioner base prior to the irradiation.

EXAMPLE 2

Encapsulated Copper Chlorophyll 2

An emulsion containing glycerol ester of wood rosin (33.33 wt/wt %), copper chlorophyll (16.67 wt/wt %) was made up in vegetable oil (50.00 wt/wt %) by gradual addition of the glycerol ester to a solution of copper chlorophyll in the vegetable oil heated to the melting point of the ester with mixing using a Silverson high shear mixer at 3000 r.p.m. for 3 minutes. The emulsion was dispersed in a hand dish wash base (uncolored Ecover®).

The resulting hand dish wash base containing the encapsulated copper chlorophyll (hereinafter designated 2) was exposed to UV irradiation using an Atlas Suntest® CPS+ benchtop apparatus (Atlas Material Testing Solutions, Linsengericht, Germany) at 765 W/m² at 35° C. during a period of 16 hours. The color of the hand dish wash base prior to, during and following the exposure is shown in FIG. 2A.

A hand dish wash base containing an encapsulated copper chlorophyll of a type known in the food industry (hereinafter designated F) was similarly prepared from maltodextrin (60 wt/wt %), copper chlorophyll (10 wt/wt %) and polysorbate 80 (1 wt/wt %) and exposed to similar UV irradiation. The color of the hand dish wash base prior to and following the exposure is shown in FIG. 2B.

TABLE 2

| Hand Dish Wash Base | Color intensity Prior to Irradiation | Color Intensity After Irradiation |
| --- | --- | --- |
| Encapsulated copper chlorophyll 2 | ++++ | +++- |
| Encapsulated copper chlorophyll (F) | ++++ | +--- |
| Unencapsulated copper chlorophyll | ++++ | ---- |

EXAMPLE 3

Encapsulated Natural Indigo

An emulsion containing sodium salt of wood rosin (9.169 wt/wt %), glycerol ester of wood rosin (9.169 wt/wt %), natural indigo (1.834 wt/wt %) capryl glycoside (17.483%) and bees wax (1.834%) was made up in water (60.513 wt/wt %) by mixing using a Silverson high shear mixer for 3 minutes at 3000 r.p.m.

A first portion of the resulting emulsion was spray dried to a blue powder and the powder dispersed in a hand dish wash base (uncolored Ecover®). A second portion of the resulting emulsion was directly dispersed in the hand dish wash.

Note that the bees wax (which has low visible light absorbance and relatively high UV absorbance) improves the physical properties of the spray dried emulsion.

The hand dish wash bases were each exposed to UV irradiation using an Atlas Suntest® CPS+ benchtop apparatus (Atlas Material Testing Solutions, Linsengericht, Germany) at 765 W/m$^2$ at room temperature during a period of 16 hours.

The color of the hand dish wash base containing the spray dried encapsulated natural indigo prior to, and following the irradiation is shown in FIG. 3C. The color of the hand dish wash base containing the directly used emulsion prior to, and following the irradiation is shown in FIG. 3B.

A suspension of natural indigo powder in the hand dish wash base was exposed to similar UV irradiation. The color of this hand dish wash base prior to, and following the exposure is shown in FIG. 3A.

As may be seen from FIG. 3C, the color of the hand dish wash base containing the spray dried encapsulated natural indigo following the UV irradiation 36 is essentially retained with little loss of intensity as compared to the color of the hand dish wash base prior to the irradiation 35.

As may be seen from FIG. 3B, the color of the hand dish wash base containing the directly used emulsion following the UV irradiation 34 is essentially retained albeit with some loss of intensity as compared to the color of the hand dish wash base prior to the irradiation 33.

TABLE 3

| Hand Dish Wash Base | Color intensity Prior to Irradiation | Colour Intensity After Irradiation |
|---|---|---|
| Encapsulated natural indigo - spray dried | ++++ | +++− |
| Encapsulated natural indigo - emulsion | ++++ | ++−− |
| Natural indigo powder | ++++ | −−−− |

By contrast, as may be seen from FIG. 3A, the color of the hand dish wash base containing the natural indigo powder following irradiation 32 is near completely lost as compared to the color of the hand wash base prior to the irradiation 31.

The outcomes of these irradiation tests are qualitatively outlined in the Table 3.

It is clearly seen from these irradiation studies, that the process of spray drying emulsions comprising encapsulated natural colors and reconstituting the emulsions gives an enhanced resistance to UV exposure as compared to directly using the emulsions.

Without wishing to be bound by theory, it appears that the spray drying provides for better encapsulation of the natural colors as compared to the emulsions.

Table 4 shows the wt/wt % composition of the spray dried encapsulated natural indigo as compared to the wt/wt % composition of the emulsion.

As may be seen, the higher proportions of natural indigo, sodium salt of wood rosin and wood rosin ester resulting from the spray drying appear to support a greater degree of encapsulation as compared to the emulsion.

The present invention renders oil soluble natural colours dispersible in water and water soluble natural colors dispersible in oils.

It enhances the visible and UV light stability of natural colors making it possible to include natural colors in HI&I formulations.

TABLE 4

| Constituent | Encapsulated natural indigo - emulsion % wt/wt | Encapsulated natural indigo - spray dried % wt/wt |
|---|---|---|
| Purified water | 60.513 | 4.340 |
| Dresinate ® X* | 9.169 | 27.127 |
| Natural Indigo | 1.834 | 5.425 |
| Capryl glucoside | 17.483 | 30.556 |
| Wood rosin ester | 9.169 | 27.127 |
| Bees wax | 1.834 | 5.425 |

*sodium salt of wood rosin

EXAMPLE 4

Encapsulated Madder Extract—

Madder Extract (0.652 wt/wt %), Cyclodextrin (2.833 wt/wt %) and Ethanol (8.5 wt/wt %) were dissolved in in Deionised Water A (28.332 wt/wt %) with mixing. The mixture was heated to 65° C. and mixed for a further 30 mins at 65° C. The mixture was left to stand for 8 hours. Then 40% Gum Rosin Ester in vegetable oil mixture (1.886 wt/wt %) was added with mixing. Gum Acacia (1.133 wt/wt %) was dissolved in Deionised Water B (56.664 wt/wt %) with mixing and then added to the Madder Extract/Gum Rosin/Cyclodextrin mixture slowly with mixing. The resulting slurry was then spray dried. The spray dried material was dispersed in the hand dish wash base (uncolored Ecover®).

The mixtures were then exposed to UV irradiation using an Atlas Suntest® CPS+ benchtop apparatus (Atlas Material Testing Solutions, Linsengericht, Germany) at 765 W/m$^2$ at 35° C. The colour of the mixture prior to exposure and after 1 hour and 2 hours of exposure is shown in FIGS. 4A, 4B and 4, in tubes labelled 42, 44 and 46. This is shown compared to unencapsulated madder extract also in FIGS. 4A, 4B and 4C in tubes labelled 41, 43 and 45. This is quantitively shown in Table 5. The Encapsulated Madder extract has a higher colour intensity prior to irradiation, but also a much higher colour intensity after irradiation, than the unencapsulated Madder extract.

TABLE 5

| | Color intensity Prior to Irradiation | Color Intensity After 1 hour Irradiation | Color Intensity After 2 hours Irradiation |
|---|---|---|---|
| Unencapsulated Madder extract | ++−− | ++−− | +−−− |
| Encapsulated Madder extract | +++++ | ++++− | ++++− |

EXAMPLE 5

Organic Silane Encapsulated Natural Indigo

An emulsion containing Phenylaminopropyl tetramethoxysilane (2.817 wt/wt %), Gum Arabic (0.282 wt/wt %) and natural indigo (5.634 wt/wt %) was made up in purified water (91.268 wt/wt %) by mixing.

A first portion of the resulting emulsion was spray dried to a blue powder and the powder dispersed in a hand dish wash base (uncolored Ecover®). A second portion of the resulting emulsion was directly dispersed in the hand dish wash.

The hand dish wash bases were each exposed to UV irradiation using an Atlas Suntest® CPS+ benchtop apparatus (Atlas Material Testing Solutions, Linsengericht, Germany) at 765 W/m² at room temperature during a period of 8 hours.

The color of the hand dish wash base containing the directly used emulsion prior to, and following the irradiation is shown in FIG. 5A. The color of the hand dish wash base containing the spray dried encapsulated natural indigo prior to, and following the irradiation is shown in FIG. 5B.

As may be seen from FIG. 5A, the color of the hand dish wash base containing the directly used emulsion following the UV irradiation 52 is retained albeit with some loss of intensity as compared to the color of the hand dish wash base prior to the irradiation 51.

As may be seen from FIG. 5B, the color of the hand dish wash base containing the spray dried encapsulated natural indigo following the UV irradiation 54 is retained albeit with some loss of intensity as compared to the color of the hand dish wash base prior to the irradiation 53.

This can be seen by contrast to FIG. 3A and Table 3 (also shown for comparison in Table 6), where the color of the hand dish wash base containing the natural indigo powder following irradiation 32 is near completely lost as compared to the color of the hand wash base prior to the irradiation 31.

The outcomes of these irradiation tests are qualitatively outlined in the Table 6.

TABLE 6

| Hand Dish Wash Base | Color intensity Prior to Irradiation | Colour Intensity After Irradiation |
|---|---|---|
| Encapsulated natural indigo - emulsion | + + + + | ++-- |
| Encapsulated natural indigo - spray dried | + + + + | ++-- |
| Natural indigo powder | + + + + | ---- |

Table 7 shows the wt/wt % composition of the spray dried encapsulated natural indigo as compared to the wt/wt % composition of the emulsion.

TABLE 7

| Constituent | Encapsulated natural indigo - emulsion % wt/wt | Encapsulated natural indigo - spray dried % wt/wt |
|---|---|---|
| Purified water | 91.268 | 2.027 |
| Phenylaminopropyl tetramethoxysilane | 2.817 | 27.027 |
| Gum Arabic | 0.282 | 3.378 |
| Natural Indigo | 5.634 | 67.568 |

Copper chlorophyll is an oil soluble dye, Madder extract is a water soluble dye and Natural indigo is a dye that effectively behaves as a pigment and is almost insoluble in all common or safe to use solvents for the described products and uses herein. Thus, herein is described the successful encapsulation of a broad range of natural dyes. This proves the possible encapsulation and use of all natural dyes and pigments for the herein described application areas.

A range of different encapsulation materials are also described and exemplified herein. Oligosaccharides or polysaccharides (e.g. Maltodextrin, Cyclodextrin) mixtures of glycoproteins and polysaccharides (e.g. Gum Arabic, Gum Acacia), oil-soluble rosins or a rosin derivatives (e.g. Glycerol ester of wood rosin, Sodium salt of wood rosin), organic silanes (e.g. Phenylaminopropyl tetramethoxysilane) and natural or synthetic waxes (e.g. bees wax).

A variety of solvents and surfactants are also described and exemplified, including oil, alcohol and water based solvents.

Encapsulation also enhances the chemical stability of natural colors so that they are better able to withstand the aggressive media found in HI&I formulations.

The enhanced stability of the encapsulated natural color is at least twice that of the unencapsulated natural colors and is consistent with the supermarket shelf-life requirement (up to 1 year) of the HI&I market.

The present invention makes a wide range of encapsulated natural colors available for use in HI&I compositions and products. The use of encapsulating materials which are naturally occurring for the natural colors further protects the environment and the consumer alike.

The present invention also provides for HI&I compositions or products which need substantially less UV absorbing additive (typically synthetic) as compared to existing H&I compositions or products. The HI&I compositions or products may be completely free from such additives.

Note that references herein to ranges "between" lower and upper values are references to ranges including the lower and upper values.

Note further that much of the technology described herein is transferable to cosmetic applications.

The invention claimed is:

1. A household, industrial, or instruction (HI&I) composition or product comprising an encapsulated natural color which is stable in water to simulated solar irradiation at 765 W/m² for a period of between 8 hours and 16 hours, wherein the encapsulated natural color comprises one or more of an encapsulating material comprising one or more of a rosin or rosin derivative, a terpene, a natural or synthetic phenol, a resin, a monosaccharide, an oligosaccharide or a polysaccharide, a protein or glycoprotein, a silicate, a silane, and a natural or synthetic wax.

2. The HI&I composition or product according to claim 1, wherein the encapsulated natural colour comprises:

i) a first encapsulating material comprising a salt of wood rosin, and a second encapsulating material comprising glycerol ester of wood rosin;

ii) a first encapsulating material comprising gum Arabic, a second encapsulating material comprising maltodextrin, and a third encapsulating material comprising modified starch;

iii) a first encapsulating material comprising cyclodextrin, a second encapsulating material comprising Gum Rosin Ester, and a third encapsulating material comprising gum acacia; or iv) a first encapsulating material comprising Phenylaminopropyl tetramethoxysilane, and a second encapsulating material comprising Gum Arabic.

3. The HI&I composition or product according to claim 1, wherein the encapsulated natural color comprises one or more of an extract or a modified extract obtained from a lichen, a microbe, a fungus, a plant or an animal.

4. The HI&I composition or product according to claim 1, wherein the encapsulated natural color comprises one or more of alkanet, lac, cutch, weld, pomegranate skin, logwood, natural indigo, henna, osage, madder, sequoia, black or purple carrot, blue fruit juice color, blue shade, vegetable juice colors, elderberry, hibiscus, purple sweet potato, red cabbage, red radish, beet juice, annatto extract, paprika, red carmine, beta-carotene, apocarotenol, lycopene, carthamus, copper chlorophyll, chlorophyll, copper chlorophyllin, chlorophyllin, turmeric (curcumin), caramel color, blue spirulina extract, apple extract, riboflavin, and lutein.

5. The HI&I composition or product according to claim 1, wherein the encapsulated natural color comprises one or more of natural indigo, madder, copper chlorophyll or copper chlorophyllin.

6. The HI&I composition or product according to claim 1, wherein the encapsulated natural color further comprises an encapsulating material comprising one or more of an ionic or non-ionic surfactant, an organic solvent, a polyvalent metal or salt thereof, a mordant or a coupling component.

7. A household, industrial, or instruction (HI&I) composition or product comprising an encapsulated natural color which is stable in water to simulated solar irradiation at 765 W/m² for a period of between 8 hours and 16 hours, wherein the natural color comprises one or more of an extract or a modified extract obtained from a lichen, a microbe, a fungus, a plant, or an animal.

8. The HI&I composition or product of claim 7, wherein the encapsulated natural color comprises:
   i) a first encapsulating material comprising a salt of wood rosin, and a second encapsulating material comprising glycerol ester of wood rosin;
   ii) a first encapsulating material comprising gum Arabic, a second encapsulating material comprising maltodextrin, and a third encapsulating material comprising modified starch;
   iii) a first encapsulating material comprising cyclodextrin, a second encapsulating material comprising Gum Rosin Ester, and a third encapsulating material comprising gum acacia; or
   iv) a first encapsulating material comprising Phenylaminopropyl tetramethoxysilane, and a second encapsulating material comprising Gum Arabic.

9. The HI&I composition or product of claim 7, wherein the encapsulated natural color comprises one or more of alkanet, lac, cutch, weld, pomegranate skin, logwood, natural indigo, henna, osage, madder, sequoia, black or purple carrot, blue fruit juice color, blue shade, vegetable juice colors, elderberry, hibiscus, purple sweet potato, red cabbage, red radish, beet juice, annatto extract, paprika, red carmine, beta-carotene, apocarotenol, lycopene, carthamus, copper chlorophyll, chlorophyll, copper chlorophyllin, chlorophyllin, turmeric (curcumin), caramel color, blue spirulina extract, apple extract, riboflavin, and lutein.

10. The HI&I composition or product of claim 7, wherein the encapsulated natural color comprises one or more of natural indigo, madder, copper chlorophyll or copper chlorophyllin.

11. The HI&I composition or product of claim 7, wherein the encapsulated natural color further comprises an encapsulating material comprising one or more of an ionic or non-ionic surfactant, an organic solvent, a polyvalent metal or salt thereof, a mordant or a coupling component.

12. The HI&I composition or product according to claim 7, comprising an encapsulating material comprising one or more of a rosin or rosin derivative or polymer, a terpene, a natural or synthetic phenol, a resin, a monosaccharide, an oligosaccharide or a polysaccharide, a protein or glycoprotein, a silicate, a silane and a natural or synthetic wax, or combinations thereof.

13. The HI&I composition or product according to claim 7, wherein the encapsulated natural color comprises:
   i) a first encapsulating material comprising a salt of wood rosin, and a second encapsulating material comprising glycerol ester of wood rosin;
   ii) a first encapsulating material comprising gum arabic, a second encapsulating material comprising maltodextrin, and a third encapsulating material comprising modified starch;
   iii) a first encapsulating material comprising cyclodextrin, a second encapsulating material comprising Gum Rosin Ester, and a third encapsulating material comprising gum acacia; or
   iv) a first encapsulating material comprising Phenylaminopropyl tetramethoxysilane, and a second encapsulating material comprising Gum Arabic.

14. The HI&I composition or product according to claim 7, comprising one or more of an extract or a modified extract obtained from a lichen, a microbe, a fungus, a plant or an animal.

15. The HI&I composition or product according to claim 7, comprising one or more of one or more of alkanet, lac, cutch, weld, pomegranate skin, logwood, natural indigo, henna, osage, madder, sequoia, black or purple carrot, blue fruit juice color, blue shade, vegetable juice colors, elderberry, hibiscus, purple sweet potato, red cabbage, red radish, beet juice, annatto extract, paprika, red carmine, beta-carotene, apocarotenol, lycopene, carthamus, copper chlorophyll, chlorophyll, copper chlorophyllin, chlorophyllin, turmeric (curcumin), caramel color, blue spirulina extract, apple extract, riboflavin, and lutein.

16. The HI&I composition or product according to claim 7, comprising one or more of natural indigo, madder, copper chlorophyll or copper chlorophyllin.

17. The HI&I composition or product according to claim 7, comprising an encapsulating material further comprising one or more of an ionic or non-ionic surfactant, an organic solvent, a polyvalent metal or salt thereof, a mordant or a coupling component.

\* \* \* \* \*